Sept. 24, 1929.   H. L. MARFAING   1,729,173
SERVO MOTOR CONTROLLED UNCLUTCHING DEVICE
FOR INTERNAL COMBUSTION ENGINES
Filed May 1, 1925   2 Sheets-Sheet 1
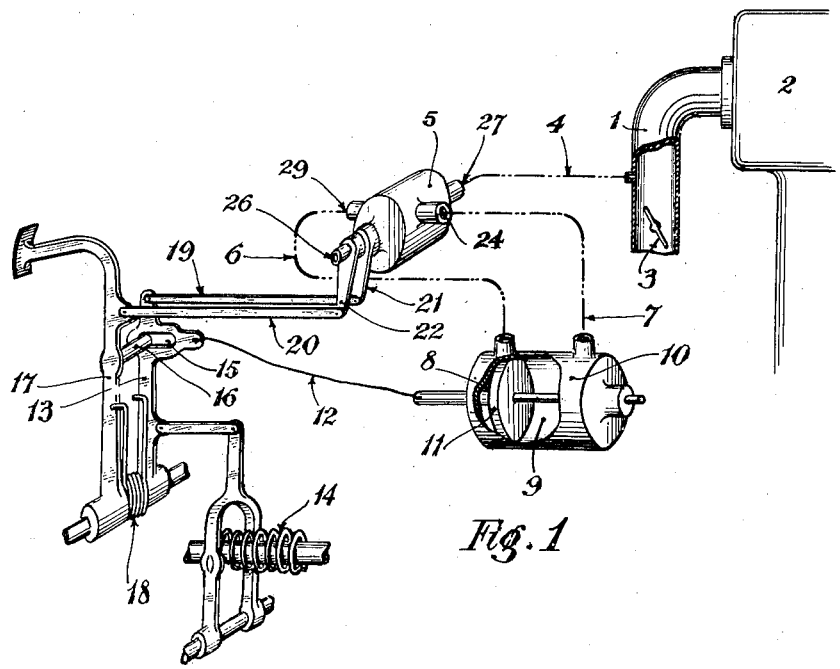
Fig. 1
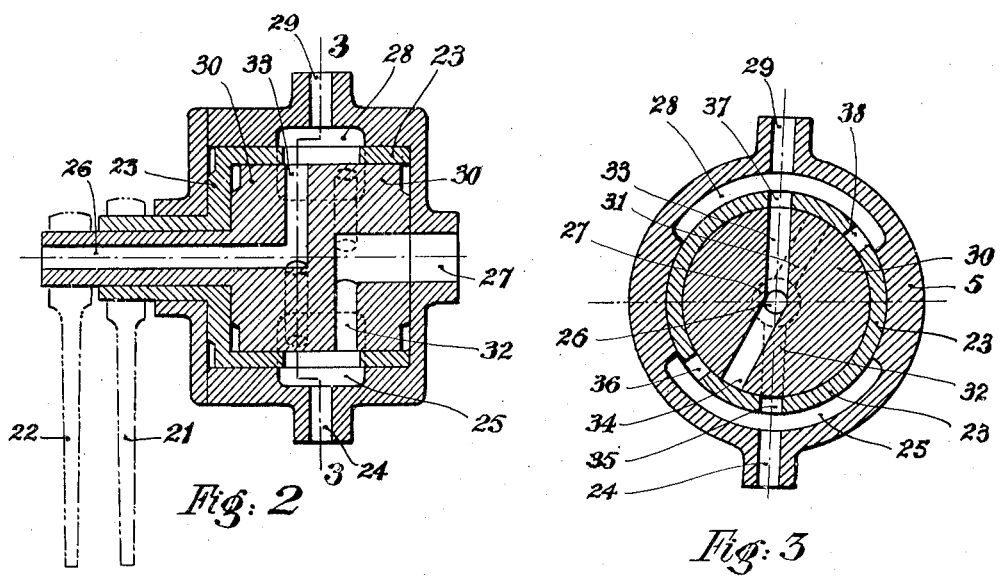
Fig. 2
Fig. 3
Inventor
H. L. Marfaing
By Mark & Clark
Attys.

Sept. 24, 1929.   H. L. MARFAING   1,729,173
SERVO MOTOR CONTROLLED UNCLUTCHING DEVICE
FOR INTERNAL COMBUSTION ENGINES
Filed May 1, 1925   2 Sheets-Sheet 2

Inventor
Henri L. Marfaing
By Marks & Clerk
his Attys.

Patented Sept. 24, 1929

1,729,173

UNITED STATES PATENT OFFICE

HENRI LÉON MARFAING, OF PARIS, FRANCE, ASSIGNOR TO COMPAGNIE ELECTRO-MÉCANIQUE, OF PARIS, FRANCE

SERVO-MOTOR-CONTROLLED UNCLUTCHING DEVICE FOR INTERNAL-COMBUSTION ENGINES

Application filed May 1, 1925, Serial No. 27,325, and in France December 31, 1924.

The invention relates to movable or stationary arrangements like those of motor vehicles of all kinds, lifting apparatuses and the like ... which are provided with a progressive coupling device interposed between an internal combustion engine and the mechanism actuated by this engine, and particularly to those arrangements which include a system of transmitting gears providing different speeds.

The object of the invention consists in new means constituting a servomoter with automatic follow-up device which may be used for unclutching and clutching a progressive coupling device by means of an intermediate driving element, in view of reducing to an insignificant value the effort to be made by the driver for overcoming the effort of the spring which is usually provided for automatically performing the reclutching.

The invention possesses other advantageous characteristics which will be hereinafter described.

Several devices have already been proposed as adapted to suppress in motor vehicles the fatigue occasioned to the driver by the frequent operation of the clutching device; in order to overcome the resistance of the clutching device, the required effort is produced by devices utilizing either the electric current or air under pressure supplied from a special compressor, or the mixture of burnt gases compressed by the engine itself during the exhaust period. These devices involve a waste of power for the engine or a supplementary expense of energy; they are moreover expensive and cumbersome, and those which utilize fluids under pressure are even, on account of the compressed air or gas tank, dangerous in case the vehicle is damaged. Other devices on the contrary utilize a driving agent which is gratuitiously available upon the engine, that is to say the relative vacuum prevailing in the inlet pipe of the engine between the cylinders and the carburetter throttle-valve.

The present invention utilizes as driving agent the vacuum so produced in the inlet conduit of the internal combustion engine; the putting in action of the said vacuum, and the magnitude of its working are suitably regulated by means of a distributing or supply cock which is subjected to a double control, acting firstly under the displacements of a driver's control lever (or pedal) and secondly under the displacements of the unclutching lever, which latter control suppresses the action of the former as soon as the desired effect of the said source of power upon the unclutching means has been entirely produced.

In this manner the driver will obtain upon the unclutching lever, the repetition of the movements which he imparts to the control lever or pedal without being obliged to exercise any other effort except what is required for operating the said supply cock, this effort being very small.

The said arrangement is essentially constituted as follows:

A piston movable in a working or auxiliary cylinder with two closed ends is connected by means of its outwardly extending rod and a flexible connecting device with a suitable lever which controls the unclutching mechanism by the use of elements known per se. By means of the above-mentioned distributing or supply cock, the two chambers formed in the cylinder by the said piston may be connected in turn with the vacuum prevailing in the engine inlet or with the atmosphere, or either chamber may be cut off from the same; the vacuum connection of one chamber coincides in all cases with the atmospheric connection of the other.

In a similar known device the suction-pipe of the combustion engine is in unrestrained communication with the atmosphere during nearly all the time which elapses between the instant of the unclutching and that of the consecutive reclutching; thus the engine sucks a considerable quantity of air which not only reduces the efficacity of said device, but is prejudicial to the carburetion of the engine and can even cause the same to stop. As it will be seen hereafter, the device according to the present invention avoids these disadvantages by the fact that the suction pipe of the engine is in communication with the atmosphere only during the operation of unclutching and that of the consecutive reclutching, whereas said communication is cut off during the whole time when the clutch remains quite disconnected or quite connected, so that as often as the device becomes actuated, the engine can only suck, in addition to the required air for the carburetion, but the quantity just contained in the auxiliary cylinder on the side at which the vacuum is to be made.

The said invention will be hereinafter set forth with reference to the appended drawings showing by way of example the application of the invention to motor vehicles.

Fig. 1 is a diagrammatic view of an embodiment of the invention wherein the two controls are combined in the distributing cock.

Fig. 2 is a lengthwise section of the said cock, and,

Fig. 3 a cross section on the line 3—3 of Fig. 2.

Figure 4:
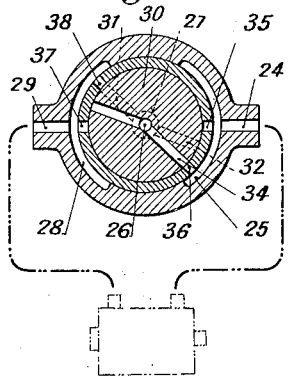
Figure 5:
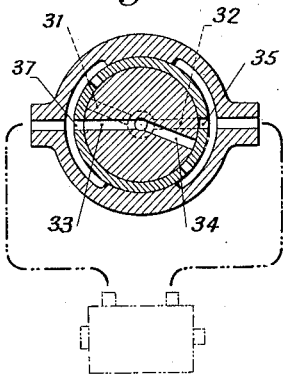
Figure 6:
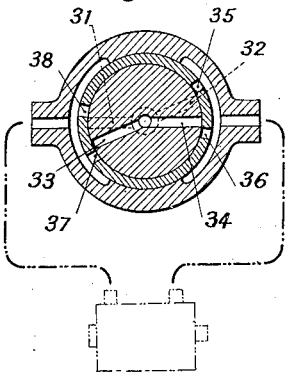

Figs. 4, 5 and 6 are various cross sections of the said cock upon the same plane, according to the different relative positions of the valve.

Figure 7:
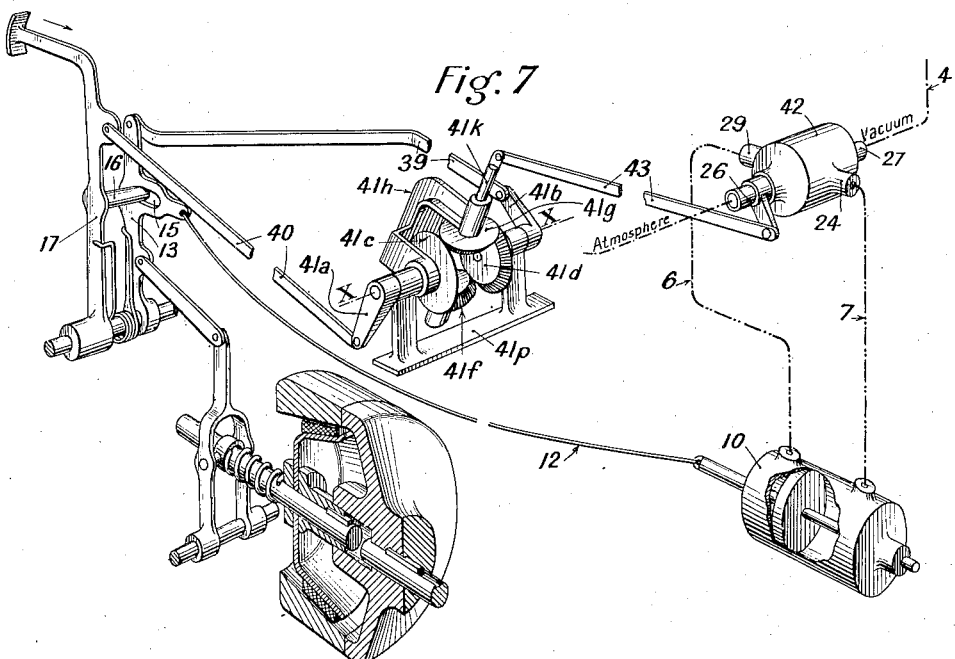

Fig. 7 shows another embodiment, wherein the two controls are combined in the device actuating the said cock. For the sake of greater clearness, the gear casing has been replaced by an open frame.

Figure 8:
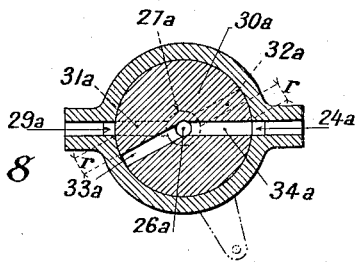

Fig. 8 is a cross section of the simple check-valve 42 of Fig. 7.

As shown in Fig. 1, the portion 1 of the inlet piping situated between the cylinders 2 and the throttle 3 of the carburettor (not shown) is connected by the pipe 4 with one of the orifices 27 of the supply cock 5 which also comprises an atmospheric orifice 26 and two lateral orifices 24 and 29 which are connected by the respective pipes 7 and 6 with the ends of a cylinder 10 co-operating with the fluid tight piston 11.

The rod extending from said piston is connected by a flexible cable 12 with a lever 13 which may act, by means of the usual devices, to compress the spring 14 in order to perform the unclutching; said lever 13 has therein the slot 15 in which is slidable an arm 16 mounted on the pedal lever 17 which is controlled by the driver's foot. The relative motion of the levers 13 and 17 will thus be limited by the slot 15. A spring 18 which abuts against the lever 13 urges the lever 17 towards the driver's foot (position Fig. 1).

Figs. 2 and 3 show the arrangement of the said cock; in order to simplify the description it will be supposed to be formed with cylindrical elements. The cock body 5 has formed therein the two chambers 25 and 28 communicating with the respective orifices 24 and 29. The rotary valve 23, or outer valve, has the four rectangular openings 35, 36, 37, 38, whereby the openings 35 and 37 are opposite to one another and also 36 and 38 opposite to one another; the valve 23 can be rotated on its axis by the lever 21 which is mounted upon its outwardly extending rod; a second rotary valve 30, or inner valve, which is coaxial with the said outer valve, comprises four conduits which are disposed respectively (Fig. 2) in two meridian planes and in two other planes parallel to one another and normal to the axis in such a manner, that the two conduits 31, 32, which open into the central conduit 27 form a broken line in the first transversal plane with the two conduits 33, 34 which open into the central conduit 26 form another broken line symmetrical to the first mentioned one, but in the second transversal plane. The central conduit 27 has a vacuum connection (Fig. 1), and the second central conduit 26 an atmospheric connection. The outer valve 23 has a definite lap with regard to the inner valve, in such a manner that the conduits 31 and 33 cannot be open at the same time neither in the port 38 nor in the port 37 and that also the conduits 32 and 34 cannot be at the same time in connection with one or the other of the symmetrically arranged ports 35 and 36 (Figs. 3–6). The inner valve 30 is controlled by the lever 22 which is mounted on its outwardly extending rod. The levers 21 and 22 are respectively connected with the unclutching lever 13 (Fig. 1) and with the control pedal 17, by the links 19, 20.

The operation is as follows:

The parts being so adjusted that when in the inoperative position, i. e. when the device is not called upon to perform the unclutching, the valves will have the relative positions shown in Fig. 4, it will be noted that the vacuum in the pipe 1 (Fig. 1) is propagated by means of the pipe 4, the conduit 27 (Fig. 4), the conduit 31, the opening 38, the chamber 28, the orifice 29, the pipe 6, (Fig. 1), to the chamber 8 of the cylinder 10; further, the chamber 9 of the cylinder has an atmospheric connection by means of the pipe 7, the orifice 24 of the cock (Fig. 4), the chamber 25, the opening 36, the conduit 34 and the conduit 26 opening into the atmosphere. Due to the difference in the pressure upon its faces, the piston 11 (Fig. 1) will be maintained in the position indicated, whereby the cable 12 is somewhat slack and has no action upon the unclutching lever 13.

Referring to Figs. 1 and 3, suppose the pedal lever to be progressively displaced to the right (clockwise); then the inner valve 30 which is actuated by the link 20 and the lever 22 will rotate in anti-clockwise direction and come from the position of rest shown in Fig. 4 into the position shown in Fig. 5, this latter figure corresponding to the instant at which the arm 16 of lever 17 reaches the opposite end of the slot 15 in the lever 13. The first part of said displacement corresponds to the lap of the valve, which prevents the central conduits 26 and 27 to be brought simultaneously in connection with the same port of the outer valve 23 as above mentioned; during this part of displacement no change occurs in the above described pipe-connections, but as soon as the conduits 33 and 32 of the inner valve have reached respectively the edge of the ports 37 and 35 of the outer valve, pressure in the chamber 8 of the auxiliary cylinder 10 becomes the same as the atmospheric pressure whilst the opposite chamber 9 has a vacuum connection hence the difference in pressure on the faces of the piston will now be in the contrary direction to that previously mentioned and the piston will move in the said cylinder and will draw upon the cable 12 which will be now stretched, thus actuating the unclutching lever 13.

But the motion of said lever will be imparted through the link 19 and the lever 21 to the outer valve, and the latter when rotating will tend to close the conduits of the inner valve which are now operative.

As long as the pedal lever 17 continues to be displaced, the proper conduits of the inner valve will coincide with the openings of the outer valve, while remaining in communication with the same chamber of the cylinder 10; so that the said piston will continue to move to the end of its stroke, or until the openings 37 and 35 are closed by their coincidence with the solid part of the cock body.

But if the said pedal lever is stopped and is held in a position such that the inner valve is stopped in the position shown in Fig. 6, the piston 11 and hence the outer valve which is connected therewith by the members 12, 13, 19, 21 will move until the said conduits and ports are out of coincidence, i. e. until the valves come into the relative positions shown in this figure. Now the arm 16 of the pedal lever 17 will be midway in the slot 15; the various parts of the device will remain in this position as long as the pedal lever is held by the driver in the position under consideration.

The action will take place in like manner for the inverse direction; when the driver releases the said pedal lever, it will tend under the action of the spring 18 to return to the inoperative position, but its motion is limited by the arm 16 which makes contact in the slot 15, and since the allowable displacement corresponds to a rotation of the inner valve such that the vacuum conduit 31 returns into coincidence with the opening 38, and the atmospheric conduit 34 with the opening 36, the pressures on the faces of the piston will thus be reversed, and the latter as well as the various controlling members will assume their various inoperative positions.

As observed, the controlling lever and the lever compressing the clutch spring are so disposed that the former, after moving through a given distance, will enter into contact with the unclutching lever, so that the driver may throw off the clutch in the usual manner, for instance in the event of damage to the apparatus.

Fig. 7 shows a modified arrangement according to the invention wherein the respective action exercised upon the vacuum and the air communications by the pedal lever 17 and the unclutching means 13, instead of taking place within the cock itself, which requires the use of two valves, are combined in the controlling device, so that the cock now comprises only a single check valve.

For this purpose, the levers 13 and 17 are connected by the respective links 39 and 40 with two crank-levers $41^a$ and $41^b$ (Fig. 17), which are respectively fastened on the shafts of the two planetary pinions $41^c$ and $41^d$ of a differential mechanism 41 (Fig. 7) known per se; said shafts being journaled in the two bearings on the support $41^p$. Said crank-levers are fastened symmetrically with regard to the plane passing through the axis $x$—$x$ of rotation of the differential and through the points at which the said links 39 and 40 are attached to the levers 13 and 17, in such manner that movements of the levers 13 and 17 in the same direction will cause said planetary pinions to rotate in opposite directions.

Two planetary pinions $41^f$ and $41^g$ engaging the planetary wheels $41^c$ and $41^d$ are as usual either loosely mounted upon two stub-shafts rigidly secured to the frame or the gear casing $41^h$, which is movable about the axis $x$—$x$, or secured upon two stub-shafts loosely revolving in bearings provided for this purpose in the frame or in the gear casing. An arm $41^k$, which is fastened with the said frame or gear casing $41^h$ of the differential, is conected by the link 43 with the lever controlling the rotary check-valve of the cock 42; said valve, as in the preceding case, comprises two independent central channels (Fig. 8) which are respectively connected with the atmosphere and the vacuum, as well as four conduits radially disposed in two meridian planes and two planes at right angles with the axis so as to form together with the above mentioned axial channels two groups so that the two channels situated in the same plane perpendicular to the axis are directly connected together and with one of the axial channels, but not with the other group (Fig. 4). The connection between the two groups is effected through the medium of two narrow chambers $24^a$ and $29^a$ parallel with the axis and diametrically opposed to the interior of the check-valve body, the length of these chambers in the direction of said axis being such that for one position of the check-valve, the left chamber is connected with a radial channel of the front group, while the right one is in connection with a radial channel of the back or rear group, the connections for the other position of the check-valve being reversed. The two chambers 24ª and 29ª are respectively connected through pipes with the front and rear spaces of the driving piston so that these spaces can be alternatively connected with the vacuum and with the atmosphere, as such is the case with the servo-motor 10 of Figure 1.

The relative position of the conduits 34ª 32ª, and 31ª, 33ª is hereby such that the lap $r$ is at least equal to the common peripherical width of said conduits. Suppose the pedal lever 17 to be progressively displaced to the right (clockwise); then the link 40 causes the crank-lever 41ª and the bevel-wheel 41ᶜ to move in anticlockwise direction; the opposite wheel 41ᵈ being at rest, the wheel 41ᵍ will hence revolve so that its center moves to the left whilst at the same time the center of the wheel 41ᶠ moves to the right; consequently the frame 41ʰ revolves around the axis $x-x$, in anticlockwise direction and the crank lever of the valve 42 rotates in clockwise direction until (Fig. 8) the conduits 33ª and 32ª begin to open the chambers 29ª and 24ª respectively; this first part of the stroke of the arm 16 in the slot 15 corresponds to the lap "$r$" of the valve 42, and merely intercepts the connections of the chambers 24ª and 29ª with the atmosphere and the vacuum, without any action on the piston of the working cylinder 10 and hence on the unclutching lever 13. But as soon as the pedal lever 17 is continued to be displaced to the right, the chambers 24ª and 29ª are progressively connected with the conduits 32ª and 33ª respectively (the full opening corresponding to the second part of the stroke of arm 16 in the slot 15), now the piston in the cylinder 10 will draw upon the cable 12 and actuate the unclutching lever 13 in the direction to the right.

But this displacement of the lever 13 is transmitted by the link 39 to the cranklever 41ᵇ and the bevel-wheel 41ᵈ which are fastened on the same shaft; said wheel rotates then in clockwise direction; the bevel-wheel 41ᶜ being motionless at this time, both the pinions 41ᵍ and 41ᶠ roll on the wheel 41ᶜ so that the arm 41ᵏ moves in clockwise direction, causing by means of the link 43 the cock 30ª to rotate in anticlockwise direction until the respective edges of the conduits 33ª and 29ª on the one hand, 32ª and 24ª on the other hand meet again together and just intercept the connections previously made, with the working cylinder 10, the various parts of the cock 42 being again in the same relative positions as above before the first opening. At this instant, the arm 16 of the pedal lever 17 is again in the middle of its stroke in the slot 15; the device is at rest and remains in this state as long as the pedal lever 17 is kept by the foot in the considered position. The various parts of the device are now ready for new operation in the same direction or for back operation in a similar manner.

With this follow-up device, the connections which have been afforded upon the two faces of the piston by the cock 42 under the control of the said pedal lever 17 will therefore be suppressed by the unclutching lever as soon as they have produced their effect upon the piston; the several parts will consequently return automatically to the inoperative position when the driver releases the pedal lever, this action being analogous to the one obtained in the disposition previously described.

To recapitulate, for equal displacements of the control lever and the unclutching lever in the same direction, the valve will be given angular displacements of substantially the same value, but in the opposite directions. Also, within the limits of the stroke which is practically allowable for these levers, the relative positions of the valve and the outer body of the cock will remain the same as long as the relative positions of the two levers are not varied.

From all the foregoing it is obvious that the desired action of the vacuum prevailing in the inlet conduit of the engine which is to perform the unclutching and to control all the movements in actuating a single cock, will be obtained in a suitable manner by the relative displacements of the pedal lever 17 and the unclutching lever 13 which respectively control the two valves of the cock 5; the amount of these displacements will correspond to the stroke of the arm 16 in the slot 15.

Having thus described my apparatus, what I claim as new therein, and my own invention, is:

1. In an engine group actuated by an internal combustion engine and comprising a clutch provided with a reaction spring, unclutching means wherein the power required to overcome the resistance of the clutch spring is supplied by the vacuum produced by the suction of the engine in the inlet conduit between the engine and the carbureter, comprising; an unclutching lever controlling the said clutch through the usual means, an unclutching pedal, means connecting this latter pedal and lever in such manner that the said lever will be displaced only after the pedal has been moved through a certain angle, a piston movable in a cylinder closed at the ends, flexible coupling means connecting the said piston with the unclutching lever, a distributing cock, two conduits connecting the respective ends of said cylinder with the said cock, a third conduit connecting said cock with the engine suction inlet, means connecting the said pedal and lever with the said cock and adapted in such a manner that after a certain stroke of the pedal (neutral stroke), without any effect on the unclutching lever and constant for all positions, every additional displacement (effective stroke) of said pedal in the same direction will cause the unclutching lever to effect a displacement in the same direction and of the same amplitude.

2. In an engine group actuated by an internal combustion engine and comprising a clutch provided with a reaction spring, unclutching means wherein the power required to overcome the resistance of the clutch spring is supplied by the vacuum produced by the suction of the engine in the inlet conduit between the engine and the carbureter, comprising: an unclutching lever controlling the said clutch through the usual means, an unclutching pedal, means connecting the said pedal and lever in such manner that the said lever will be displaced only after the pedal has been moved through a certain angle, a piston movable in a cylinder closed at the ends, flexible coupling means connecting the said piston with the unclutching lever, a distributing cock, two conduits connecting the respective ends of said cylinder with the said cock, a third conduit connecting said cock with the engine suction inlet, a link device connecting the pedal, with the said cock and adapted to place the side of the piston farthest from the said unclutching lever in communication with the conduit leading to the engine suction inlet when the pedal is operated, while at the same time connecting the other side of the piston with the atmosphere, a second link device connecting the said unclutching lever with the said cock and adapted to intercept the respective connection between the sides of the piston and the engine suction pipe and the atmosphere when the said lever is displaced through an angle equal to the angular displacement of the pedal.

3. In an engine group actuated by an internal combustion engine and comprising a clutch provided with a reaction spring, unclutching means wherein the power required to overcome the resistance of the clutch spring is supplied by the vacuum produced by the suction of the engine in the inlet conduit between the engine and the carbureter, comprising: an unclutching lever controlling the said clutch through the usual means, an unclutching pedal, an arm disposed thereon, an arc-shaped slot formed in the said lever, wherein the said arm is engaged, a piston movable in a cylinder closed at the ends, flexible coupling means connecting said piston with the unclutching lever, a distributing cock, two conduits connecting the respective ends of said cylinder with the said cock, a third conduit connecting said cock with the engine suction inlet, means connecting the said pedal and lever to the said cock and adapted in such a manner that every displacement of the pedal greater than a certain neutral and inoperative displacement which is constant for all positions, causes the unclutching lever to effect a displacement in the same direction and of the same amplitude.

In testimony whereof I have hereunto affixed my signature.

HENRI LÉON MARFAING.